United States Patent [19]

Kroniger

[11] 4,326,734
[45] Apr. 27, 1982

[54] REAR AXLE FOR MOTOR VEHICLES

[75] Inventor: Wilhelm Kroniger, Friolzheim, Fed. Rep. of Germany

[73] Assignee: Dr. Ing. h.c.F. Porsche AG, Stuttgart, Fed. Rep. of Germany

[21] Appl. No.: 146,165

[22] Filed: May 2, 1980

[30] Foreign Application Priority Data

May 4, 1979 [DE] Fed. Rep. of Germany ....... 2918009

[51] Int. Cl.³ ............................................. B60G 11/14
[52] U.S. Cl. .................................... 280/724; 280/688
[58] Field of Search .............. 280/111, 113, 125, 109, 280/688, 724

[56] References Cited

U.S. PATENT DOCUMENTS 2,954,835 10/1960 Janeway ............................. 280/724

FOREIGN PATENT DOCUMENTS 1948908 6/1970 Fed. Rep. of Germany ...... 280/688
1911795 9/1970 Fed. Rep. of Germany ...... 280/688
814306 6/1959 United Kingdom ................ 280/688

Primary Examiner—Joseph F. Peters, Jr.
Assistant Examiner—Ross Weaver
Attorney, Agent, or Firm—Craig and Antonelli

[57] ABSTRACT

A rear axle assembly for motor vehicles with an axle being of rigid design, running at right angles to the lengthwise axis of the vehicle is pivotably mounted to the vehicle body by a support bearing located on the central lengthwise axis of the vehicle and by guide bearings via two trailing arms connected to the axle beam, the axle beam being held away from the vehicle body shock absorber struts. The trailing arms and axle beam are connected to form a one-piece wheel guiding element for the rear wheels of the vehicle which are carried by the axle beam in a manner achieving an instantaneous rotational pole that is located rearward of the rotational axis of the wheels carried by the axle beam, with respect to a forward direction of travel, and the guide bearings being transversely flexible, permitting a roll steering effect of the rear wheels and forming a horizontal pivot axis for the assembly which runs in front of the wheels' rotational axis relative to said forward direction of travel, during straight line travel of the vehicle, but extends approximately between the support bearing and one of the rear wheels of the vehicle as said vehicle travels through a curve. The support bearing is constructed so as to be flexible in horizontal load directions, but rigid in vertical load directions, while the guide bearings are axially elastic and radially rigid.

9 Claims, 4 Drawing Figures

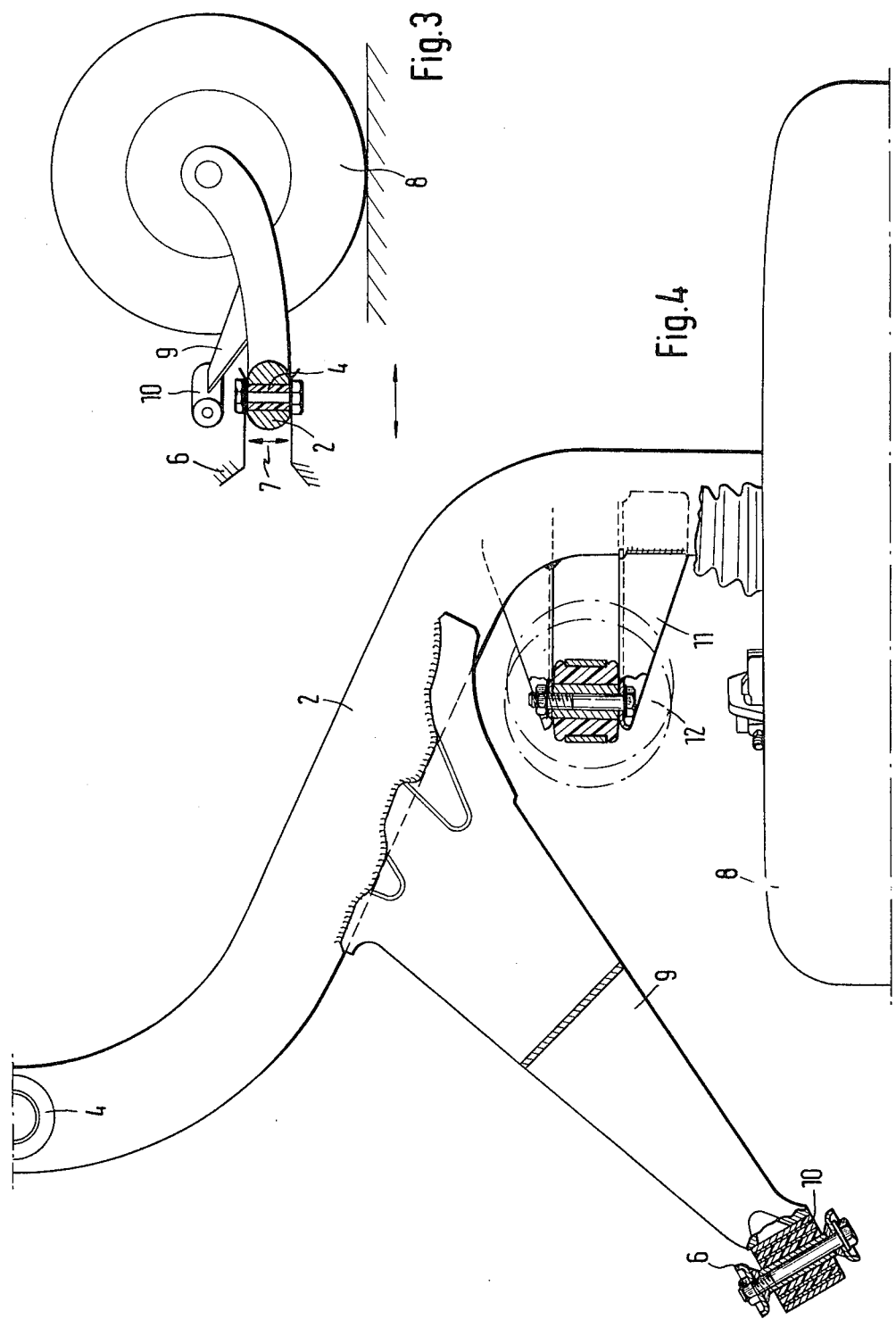

REAR AXLE FOR MOTOR VEHICLES

BACKGROUND AND SUMMARY OF THE INVENTION

The invention relates to a rear axle for motor vehicles, with an axle beam of rigid design, running at right angles to the lengthwise axis of the vehicle, said axle beam being mounted pivotably to the vehicle body by a support bearing located on the central lengthwise axis of the vehicle and by guide bearings, through two trailing arms connected to the axle beam, said axle beam further being held away from the vehicle body by shock absorber struts.

German Offenlegungsschrift No. 1,911,795 teaches a rear axle for motor vehicles, said axle comprising a rigid, bent crosstube as well as trailing arms which are torsion- and bending-resistant, said trailing arms being pivotably mounted in bearings on the crosstube and the vehicle body. The rear axle is mounted to the vehicle body by three bearings, whereby, in addition to the two outer bearings on the crosstube, a third guide bearing is provided in the middle of the crosstube, said third bearing occupying a position on the central lengthwise axis of the vehicle and extending in the horizontal lengthwise direction of the vehicle. This central guide bearing serves primarily to accept lateral and longitudinal forces. A rear axle of this design is expensive to construct and requires the use of bearings for the trailing arms which must be adjusted precisely, especially at the points where the trailing arms are attached to the crosstube. Forces are transmitted to the body primarily via the central guide bearing when a rear axle of this type is used, whereby only a small support base is provided for the rear axle. Moreover, it is also disadvantageous that the rigid arms prevent the axle from producing a stabilizing effect when the vehicle rounds a curve.

Another object of the invention is to provide a rear axle of the type described hereinabove, said axle having a support base which meets the corresponding requirements and makes it possible simultaneously to produce a stabilizing effect when the vehicle traverses a curve.

This object is achieved by the features of preferred embodiments of the invention which include the fact that an axle beam is connected with two trailing arms to form a one-piece wheel guiding element having an instantaneous rotational pole located rearwardly of the rotational axis of the vehicle rear wheels.

The advantages achieved with the invention include the fact that the simple design of such a rear axle permits preassembly of the complete axle unit without costly adjustments being necessary after installation. Only three articulation points to the vehicle body are provided with this rear axle, whereby a relatively large support base is produced and a satisfactory transmission of force to the vehicle body is achieved. The elasticity of the guide bearings for the trailing arms permit a high degree of ride comfort by lengthwise and transverse springing, without having a negative effect on handling. Moreover, it makes possible wheel guidance with changes in the kingpin angle and in the toe-in, as well as keeping the wheel gauge constant, as with a rigid axle. In addition, there are no undesirable elastic changes in toe-in when traveling in a straight line under varying load conditions. On the other hand, when rounding a curve, desirable positive understeer in response to lateral forces is achieved.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 3 is a section along line III—III in FIG. 2; and

FIG. 4 is an embodiment of the rear axle.

DETAILED DESCRIPTION OF THE PREFERRED EMBODIMENT

Figure 1:
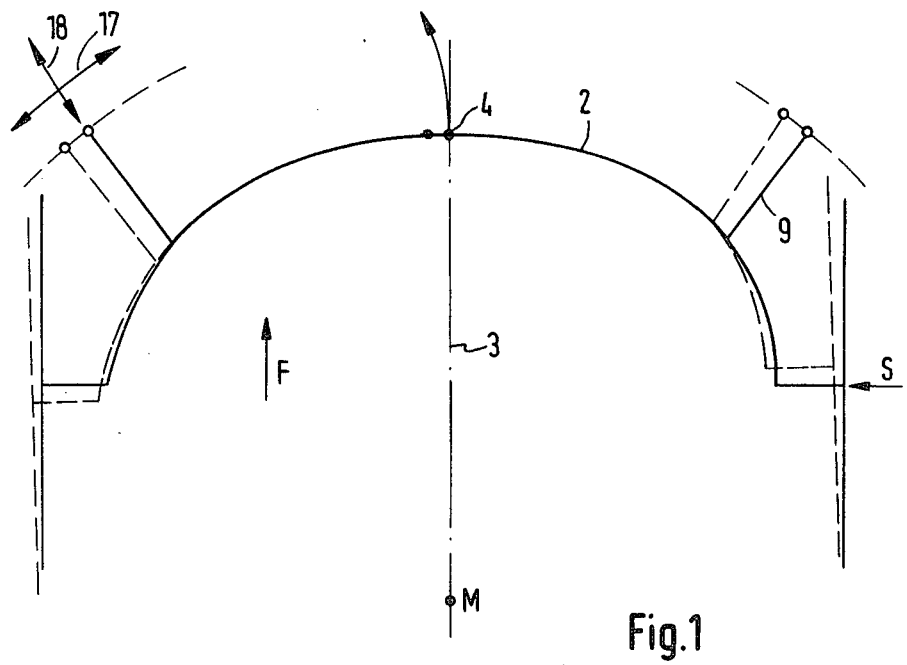
FIG. 1 is a schematic representation of the rear axle in the normal position (solid lines) and under the influence of lateral forces when traversing a left-hand curve (dashed lines)

Rear axle 1 comprises a curved axle beam 2, which is rigid and is mounted to the vehicle by a support bearing 4 located on the central lenthwise axis 3 of the vehicle. Support bearing 4 comprises, for example, a rubber and metal bearing, whereby axle beam 2 is flexible lenthwise and crosswise, but is rigidly guided in the vertical direction 7 (FIG. 3). Likewise, a design is possible in which axle beam 2 has a formed section which runs in a horizontal plane and is held between two rubber bearings on the body instead of a single bearing 4 as shown. Two trailing arms 9 serve for further guidance of wheels 8 of the rear axle, said arms being connected at one end elastically with body 6, through the intermediary of guide bearings 10, and at the other end rigidly with axle beam 2, such as by welding. A shock absorber strut 12 abuts a gusset 11 mounted on axle beam 2 near each end of axle beam 2. The rear wheels 8 are driven by driving shafts 5, forming no part of the present invention.

Figure 2:
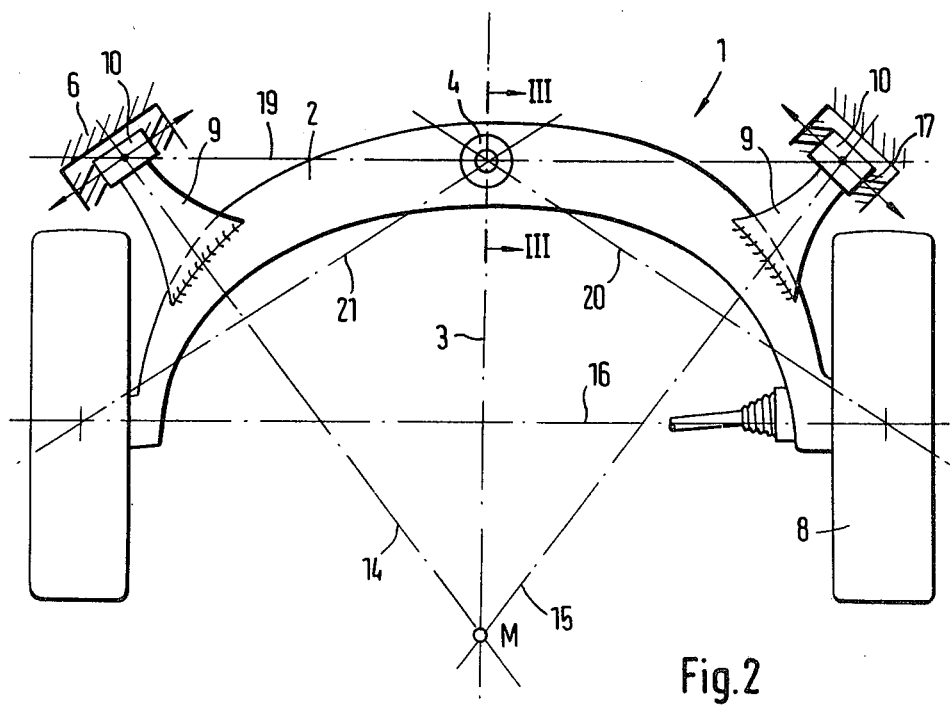
FIG. 2 is a schematic drawing of the rear axle.

Trailing arms 9 are located in an approximately, but not exactly, horizontal plane that is positioned at an angle with respect to the central lengthwise axis 3 of the vehicle, and are located on both side of axle beam 2. The bearings 10, on arms 9, are thus located slightly above beam 2 (FIG. 3), and have a longitudinal axis that extends in a horizontal plane in directions generally as shown by the associated arrows in FIG. 2, but the specifics of which are unimportant to the invention as a whole.

The central axes 14 and 15 of the two trailing arms 9 intersect at a point M which, viewed in the forward direction of travel F, is located behind the rotational axis of the wheels 16 and forms an instantaneous center of rotation for the movement of the wheels when the vehicle rounds a curve. The trailing arms 9 are each formed of one spring leaf which permits rotation and flexing in the horizontal transverse direction.

Control bearings 10 of the two trailing arms 9 comprise, for example, rubber and metal bearings, by means of which the trailing arms 9 are guided elastically in axial direction 17 and rigidly in radial direction 18 (FIG. 1). Thus, trailing arms 9, under the influence of lateral forces S (FIG. 1), which occur when the vehicle is traversing a curve, can perform an elastic sliding movement in direction 17. On the other hand, trailing arms 9 cannot undergo any significant displacement in radial directions 18. In addition, the invention contemplates the use of slide bearings, as shown in greater detail in FIG. 4, as suitable for use as guide bearings 10. The slide bearings 10 then control the movement of arms 9 in directions 17 and 18.

Trailing arms 9 transmit the forces which develop at the axle via guide bearings 10 in the lengthwise and transverse directions to vehicle body 6. Support bearing 4 on axle beam 2 serves basically only to support the latter in the vertical direction with respect to the body, and to control the movement of the axle under braking forces in such a manner that this bearing 4 need no longer accept longitudinal and transverse forces.

The two guide bearings 10, which are located in a common plane, form a pivot axis 19 about which the entire rigid axle moves when traveling in a straight line and with deflection, without kingpin angle, toe-in, or wheel gauge changes. When the vehicle traverses a curve, the axis is rotated through instantaneous pole M under the influence of lateral forces S and around a rotational axis which lies on the lengthwise axis, 3, of the vehicle through bearing 4. The spring leaves of arms 9 are then deformed elastically, whereby there is a hardening of the scroll spring rate and hence, a stabilizing effect. As shown in greater detail in FIG. 1 for the vehicle going around a left-hand curve, the entire axle is pivoted from the position shown by the solid lines, to the position shown by the dashed lines. The wheel which is on the outside of the curve then shifts into toe-in and the wheel on the inside of the curve shifts to toe-out, whereby understeering is produced.

When the vehicle traverses a curve, with additional unilateral spring compression on one wheel side of the vehicle, a rotational axis 20 or 21 is produced, from support bearing 4 to wheel 8, around which a pivoting movement takes place.

In the embodiment shown, axle beam 2 is shown to be curved. It would also be possible for this axle beam 2 to have a different shape as well. The only important point regarding the design of the axle beam 2 itself is that pivot axis 19 must be in front of wheel rotation axis 16 relative to the direction of travel F.

While I have shown and described one embodiment in accordance with the present invention, it is understood that the same is not limited thereto but is susceptible to numerous changes and modifications as known to those skilled in the art and I therefore do not wish to be limited to the details shown and described herein but intend to cover all such changes and modifications as are encompassed by the scope of the appended claims.

I claim:

1. Rear axle assembly for a motor vehicle with a rigid axle beam running crosswise to the lengthwise axis of the vehicle, said axle beam being mounted pivotably to the vehicle body via one support bearing located on the central lengthwise axis of the vehicle for vertically supporting the axle beam relative to the vehicle body and by two trailing arms, connected to the axle beam, via guide bearings, characterized by the fact that said axle beam is rigidly connected with the two trailing arms so as to transmit forces occurring transversely and longitudinally of the vehicle to the guide bearings and to form a one-piece wheel guiding element for rear wheels of the vehicle, carried by said axle beam, said guiding element having an instantaneous rotational pole that is located rearward of the rotational axis of said wheels carried by said axle beam, with respect to a forward direction of travel, and in that said guide bearings are constructed so as to be more rigid in a radial load direction of the bearing than in an axial load direction of the bearing, permit a roll steering effect of the rear wheels, and form a horizontal pivot axis relative to said forward direction of travel, during straight line travel of the vehicle.

2. Rear axle assembly according to claim 1, characterized by the fact that trailing arms comprise spring leaves which are constructed in a manner enabling them to twist and flex readily.

3. Rear axle assembly according to claim 1, characterized by the fact that said axle beam is curved and the curve extends in front of said wheel rotation axis relative to said forward direction of travel.

4. Rear axle assembly according to claim 1, characterized by the fact that said support bearing is constructed to be flexible in a horizontal load direction.

5. Rear axle assembly according to claim 4, wherein said support bearing is arranged so as to be rigid in a vertical load direction.

6. Rear axle assembly according to claim 1, wherein said support bearing is arranged to be rigid in a vertical load direction, and wherein the bearing at an end of each of the trailing arms is disposed in a horizontal plane and is constructed, for enabling shifting of said axle assembly about said instantaneous rotational pole due to transverse loads imposed as the vehicle travels through a curve.

7. Rear axle assembly accordng to claim 6, wherein said trailing arms are arranged with their central longitudinal axes intersecting at said instantaneous rotational pole.

8. Rear axle assembly according to claim 7, wherein said guide bearings are constructed for causing said horizontal pivot to shift to a line extending approximately between said support bearing and one of the rear wheels of the vehicle as said vehicle travels through a curve.

9. Rear axle assembly according to claim 1 or 6 or 8, wherein said guide bearings are axial slide bearings.

* * * * *